United States Patent Office.

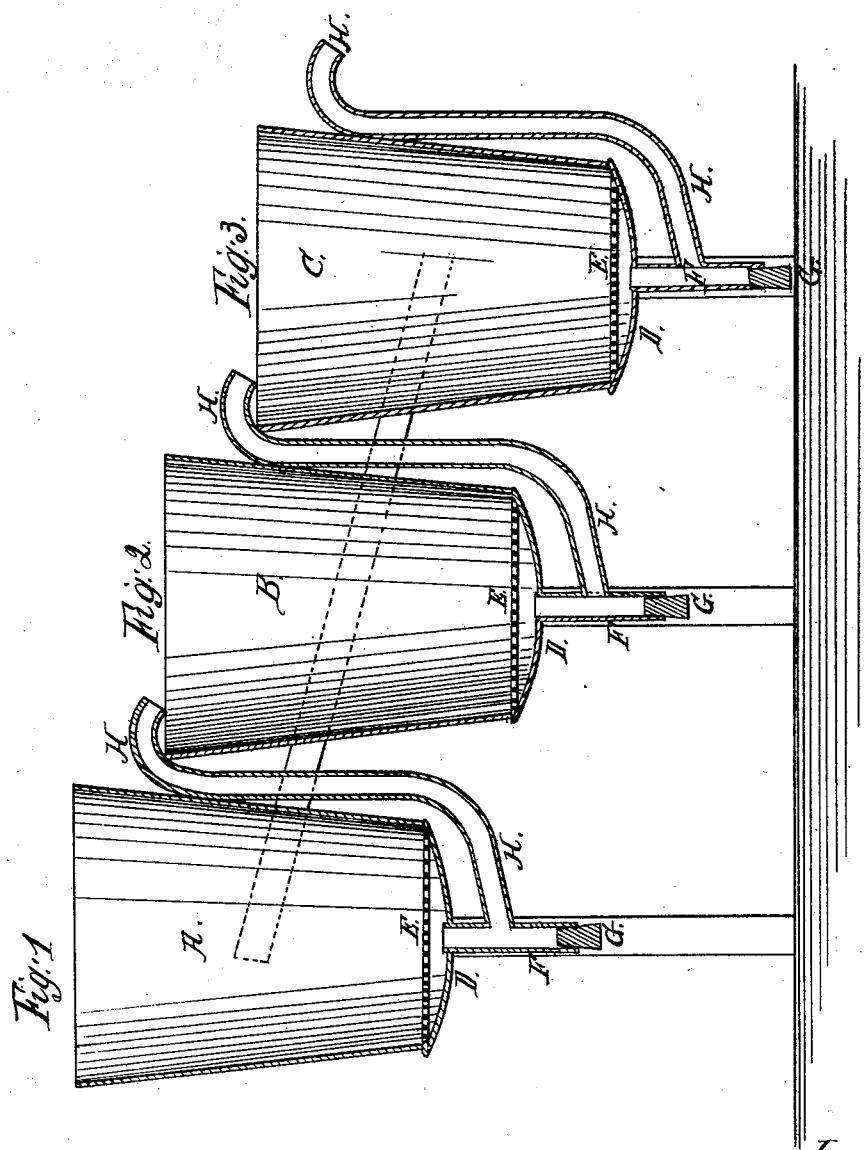

PETER FAHRNEY, OF CHICAGO, ILLINOIS.

Letters Patent No. 110,025, dated December 13, 1870.

IMPROVEMENT IN MEDICAL COMPOUNDS AND APPARATUS FOR MAKING THE SAME.

The Schedule referred to in these Letters Patent and making part of the same.

*To all whom it may concern:*

Be it known that I, PETER FAHRNEY, of Chicago, in the county of Cook and State of Illinois, have invented a new and useful Percolator and Medical Compound; and I do hereby declare the following to be a full, clear, and exact description thereof, which will enable others skilled in the art to which my invention appertains to make and use the same, reference being had to the accompanying drawing forming part of this specification, in which—

The figure is a longitudinal vertical section of a series of percolators arranged for the preparation of the medical compound.

My invention has for its object to provide an improved medical compound combining the virtues of an alterative and cathartic in the form of a fluid extract, in the preparation of which I employ the following ingredients in about the proportions specified:

Peppermint, two pounds; scullcap, one pound; Turkey corn, one pound; gentian, one pound; skunk cabbage-root, one pound; jalapa, three pounds; and mandrake, five pounds.

These ingredients are thoroughly mixed and triturated in any convenient vessel.

They are then saturated with diluted alcohol and allowed to macerate twenty-four hours.

The compound thus prepared is divided into three equal parts, and placed in the percolators A B C, which are constructed in the following manner:

Each percolator is composed of an upright cylindrical vessel having a depressed bottom, D, and a false perforated bottom, E.

F are short vertical pipes entering each percolator through the main bottom and provided with a stopcock or plug, G.

The percolators are arranged in line with each other, and at different heights, so that the contents of one shall be discharged into the other through siphons H, connecting at one end with the pipes F and discharging into the next vessel, over the top, as shown.

By this arrangement a portion of the contents of A will be discharged into B, and from thence into C, as will be readily understood.

After the compound has been equally divided and one part placed in each vessel, hot water is poured gradually into the percolator A until a certain quantity charged with the compound is discharged into the percolator B, and from thence into the percolator C, from which it is withdrawn into any suitable vessel placed under the short pipe F.

In supplying the hot water care should be exercised to keep the percolator A constantly full.

When the compound or extract has been discharged from C it is boiled down about one-half, sweetened with sugar or other substance, and after cooling is bottled for use.

If desired, it may be flavored with fennel-seed, either oil or tincture.

I do not intend to confine myself to the use of three percolators, as circumstances may require the use of a lesser or greater number.

They need not, moreover, be used together, but may be used separately, although their combined use is preferable because most convenient.

Having thus described my invention,

What I claim as new, and desire to secure by Letters Patent, is—

1. The medical compound, composed of the ingredients and prepared by the process, substantially as herein described.

2. The percolators, each constructed as described, of the cylindrical vessel provided with the main bottom D, perforated false bottom E, short tube F, and siphon H, as herein set forth and shown, for the purpose specified.

3. The medicine composed of the ingredients herein described, producing a combined alterative and cathartic in the form of a fluid extract.

P. FAHRNEY.

Witnesses:
E. A. ELLSWORTH,
N. K. ELLSWORTH.